Patented Oct. 25, 1949

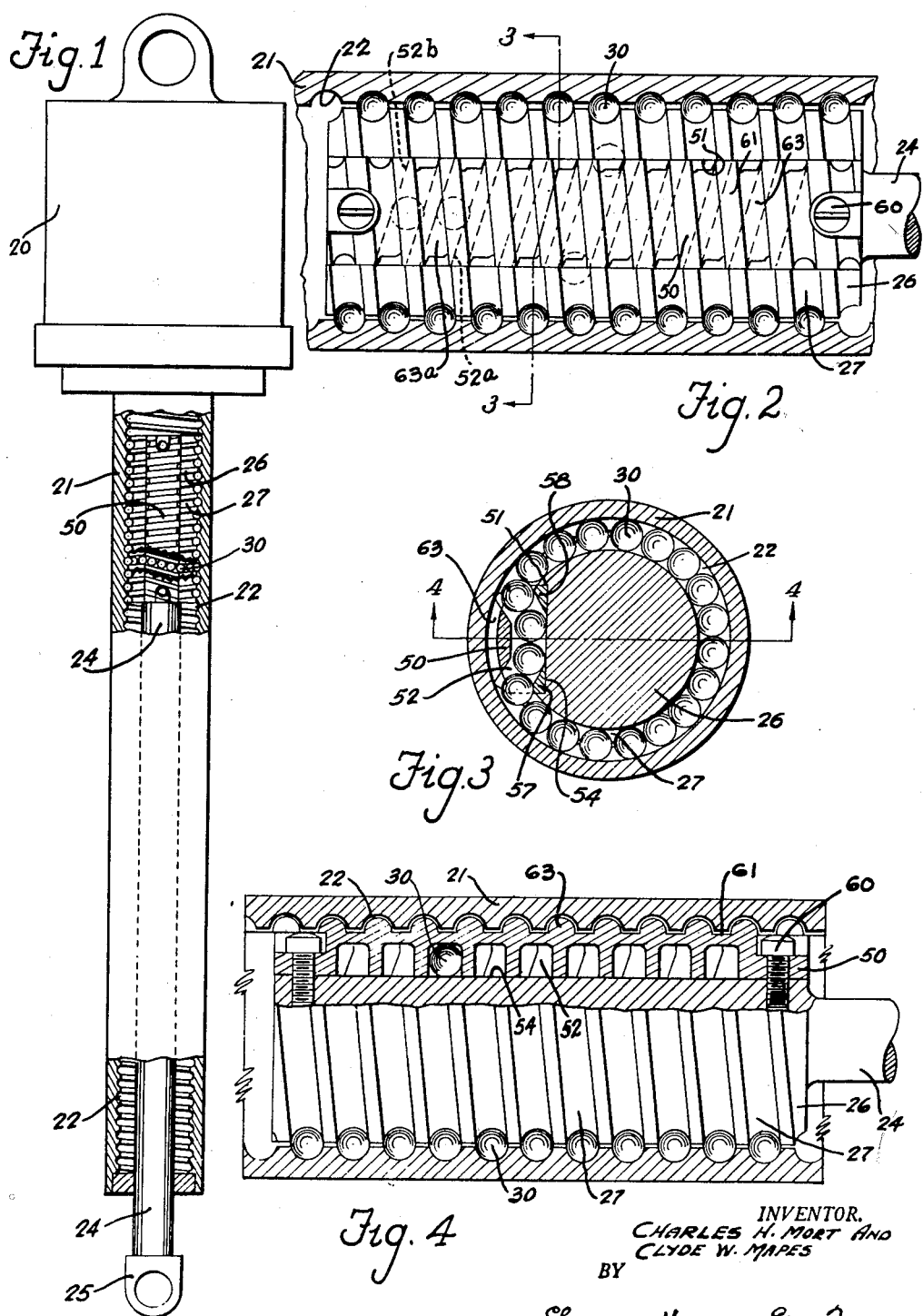

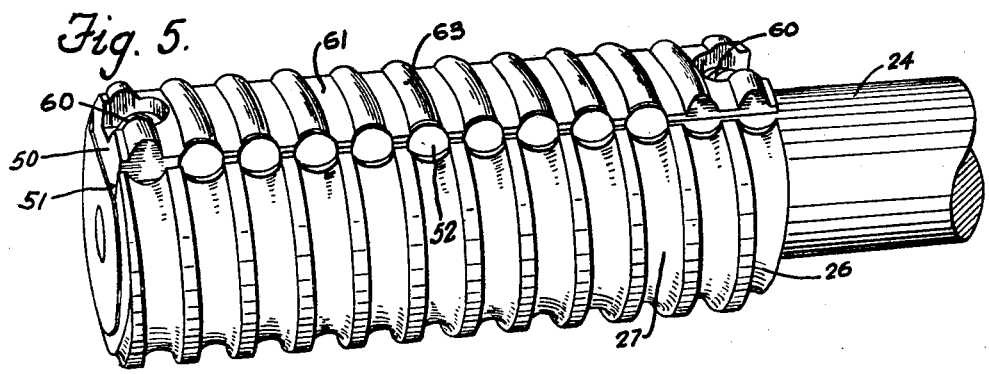
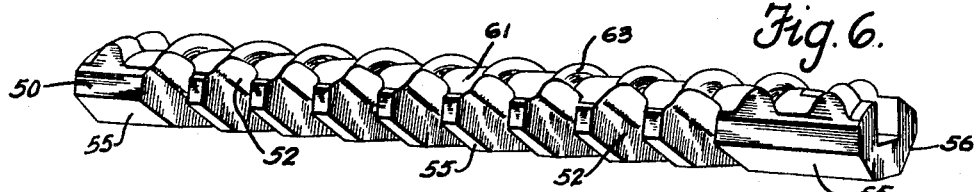
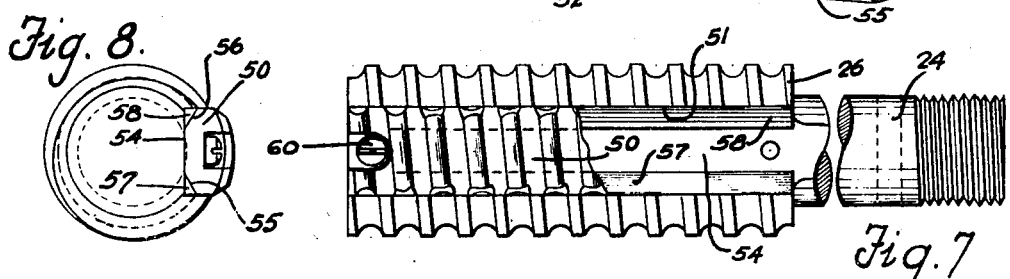
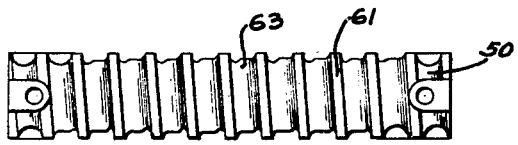
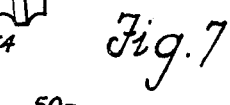
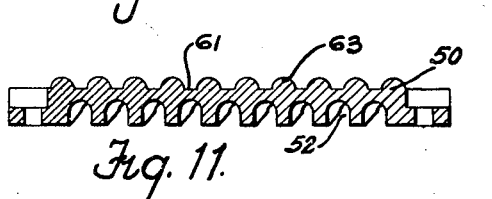
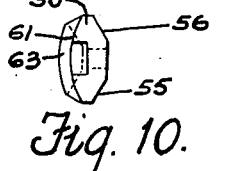
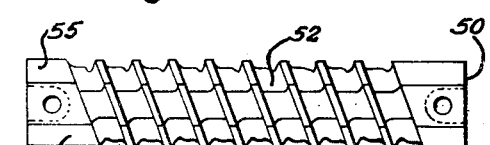

2,486,055

UNITED STATES PATENT OFFICE 2,486,055

ANTIFRICTION SCREW AND NUT ACTUATOR

Charles H. Mort and Clyde W. Mapes, Dayton, Ohio, assignors to General Motors Corporation, Detroit, Mich., a corporation of Delaware Application January 29, 1948, Serial No. 5,126

6 Claims. (Cl. 74—459)

1

This invention relates to improvements in screw and nut devices in which antifriction balls are used mechanically to connect the screw and nut.

It is among the objects of the present invention to provide either the screw or the nut of a screw and nut device with a single turn channel in which antifriction balls may circulate and mechanically connect the nut and screw continuously.

In order to provide a single turn, continuous groove in which the antifriction balls may circulate, said groove must have a portion coinciding with the helical groove in the cooperating element, that is, if the single turn, continuous groove is in the screw, the one portion of said single turn, continuous groove must coincide with the continuous helical groove in the nut, while the other portion of said single turn, continuous groove must l.s an angular crossover, angularly opposite to the pitch of the helical groove in the nut.

Screws with such single turn, continuous grooves have been made by machining the odd shaped groove directly in the peripheral surface of the shaft. This requires an exceedingly difficult and intricate machine operation.

The present invention has for its object to avoid such expensive and intricate machine operations by providing a prefabricated insert plate adapted to be produced by simple die cast process or the like, said plate being adapted to be secured in a longitudinal channel in the screw or nut, which channel interrupts the continuity of the helical groove therein, thereby permitting the pre-formed plate to provide the crossover which connects the severed ends of a helical convolution and thus forms a closed, single turn groove, one portion of which is helical, the other an angular crossover.

The prefabricated insert plate of the present invention is such that the open, angular furrows therein form, when said plate is attached to the nut or screw, the arch portions of connecting tunnels, the base of the tunnels being provided by the bottom of the longitudinal channel in the nut or screw. This permits preforming of the insert plate by the simple and inexpensive die cast process and completely avoids expensive and intricate machine operations if, for instance, the insert plate per se would form the complete connecting tunnel.

A still further object of the present invention is to provide the insert plate with angular ribs coinciding with and adapted to enter and move in

2 the helical groove of the cooperating member, said ribs acting as deflectors for preventing the connecting antifriction balls from being diverted from the single turn groove in which they circulate. These ribs in no way act as a mechanical connection between the nut and screw, the antifriction balls being the sole means to perform this function.

Further objects and advantages of the present invention will be apparent from the following description, reference being had to the accompanying drawings, wherein a preferred embodiment of the present invention is clearly shown.

In the drawings:

Fig. 1 is a part sectional, part elevational view of a device equipped with the present invention.

Fig. 2 illustrates the screw, equipped with the present invention, in position in the tubular nut, a fragment of which is sectionally shown.

Fig. 3 is a transverse, sectional view taken along the line 3—3 of Fig. 2.

Fig. 4 is a fragmentary, sectional view taken in the direction of the arrows 4—4 of Fig. 3.

Fig. 5 is a perspective view of a screw shaft constructed in accordance with the present invention.

Fig. 6 is a perspective view of the prefabricated insert plate, the feature of the present invention.

Fig. 7 is a view of a screw having a fragment of an insert plate shown in the longitudinal channel in the screw.

Fig. 8 is an end view of the screw shown in Fig. 7.

Fig. 9 is a view of the insert plate, showing the ribbed side thereof.

Fig. 10 is an end view of the plate shown in Fig. 9.

Fig. 11 is a central, longitudinal, sectional view of the plate shown in Fig. 9.

Fig. 12 is a view of the furrowed side of the plate shown in Fig. 9.

Referring to the drawings, Fig. 1 illustrates the invention applied to an electric motor driven power device in which the electric motor 20 rotates the elongated tubular member referred to hereinafter as the nut 21. It will be noted that the nut 21 has a continuous helical groove 22 substantially semi-circular in cross section, provided in its inner peripheral surface, substantially throughout its entire length. In this particular application, the screw shaft 24 is the non-rotatable element of the combination, having a clevis end 25 adapted to be attached to any member to be moved by the device. Shaft 24 has a head portion 26 of enlarged diameter so as to fit slidably within the tubular nut 21, the outer peripheral head portion having a helical groove 27 of a size and pitch identical with the helical groove in the nut. The coinciding grooves of the nut and shaft form a helical channel substantially circular in cross section.

In order mechanically to connect the nut and shaft, so that rotation of the one will cause the other, non-rotating member to move axially relatively thereto, antifriction balls 30 are provided to circulate in said helical channel. To assure circulation of the antifriction balls and prevent their passing out of said helical channel at one or the other end thereof as one element is rotated relatively to the other, the helical channel cannot consist of continuous helical convolutions, but must consist of one or more closed circuit convolutions in which the balls circulate around and around. Such a closed circuit convolution comprises a single convolution groove in one of the cooperating members, screw or nut, said single convolution consisting of a helical portion coinciding with the continuous helical groove in the cooperating member and an opposed angular crossover portion connecting the two opposite ends of the helical portion of the single convolution groove.

A single convolution, closed circuit groove may be provided in one of the cooperating elements, for instance, the shaft, by machining the shaft and cutting a groove consisting partly of a helical portion and partly of a connecting, angular crossover portion. This machining operation is, however, exceedingly complicated and expensive and prohibitive for large quantity commercial production.

The present invention completely avoids the aforementioned intricate and expensive machining operation by simply cutting a longitudinal channel in a helically grooved shaft and then securing a preformed insert plate in said channel, said plate having open furrows angularly arranged, each furrow providing the crossover portion of a respective single convolution, closed circuit groove. The present invention reduces production time and costs inasmuch as the shaft may be helically grooved and longitudinally channeled by simple machine operations and the insert plate may be prefabricated by the die casting process, all of which lends itself nicely to large quantity production.

The Figs. 5 to 12 inclusive illustrate the prefabricated insert plate 50 which may be made of any suitable material by the molding or die cast process. Plate 50 is adapted to be secured in the longitudinal channel 51 which interrupts the continuity of the helical groove 27 in the head portion 26 of shaft 24. This channel 51 is sufficiently deep to come below the bottom of the helical groove 27, thus shaft portion 26, instead of having a continuous, helical groove 27, has a plurality of side by side, incomplete and disconnected, circumferential grooves of helical conformation. The insert plate 50 with its angular furrows 52 provided in its one side surface, said furrows being as wide as and spaced identical with the helical groove in the shaft, yet of a pitch angularly opposed to the pitch of said helical groove, provides the connecting crossover channels, for each furrow in the insert plate, thus connects the severed ends of an incomplete and disconnected, circumferential groove in said shaft. Each groove in the shaft thus becomes a single convolution, closed circuit groove comprising the helically formed portion in the shaft itself and the angular crossover portion formed by the furrowed insert plate.

As shown in the Figs. 3 and 8, the channel 51 in shaft portion 26 is rectangular in shape, that is, the side walls thereof are at right angles to the bottom wall 54 of the channel. The insert plate 50, fitting into this channel 51, does not have sharp cornered, longitudinal edges, but on the contrary, these edges are chamfered as at 55 and 56, providing a triangular space at each corner of the channel 51, in which a triangular shaped fillet strip 57 along the chamfered edge 55 and strip 58 along the chamfered edge 56 is provided. These strips, having their what may be termed "hypotenuse surface" exposed at the ends of each severed helical groove convolution in the shaft, form ramps over which the antifriction balls 30 roll while circulating, as will be described later.

The chamfered side of the insert plate 50, or more particularly, the side of the plate engaging the bottom wall 54 of the longitudinal channel 51 in the shaft portion 26, has a plurality of furrows 52 which, as previously described, coincide with the helical groove 27 in the shaft, both in width and spacing, but all of a pitch angularly opposed to the pitch of the helical groove. Each furrow 52 forms the open arched portion (Fig. 4) of a crossover tunnel which connects the two oppositely disposed ends of a severed helical groove convolution in the shaft portion 26, the bottom surface 54 of the longitudinal channel 51 in said shaft portion forming the base wall of said crossover channel when the insert plate is secured to the shaft by the screws 60.

The side of the insert plate 50, opposite the chamfered side or more particularly the outside 61 of plate 50 when it is attached to the shaft is arcuated to conform to the curvature of the inside annular wall of the nut 21 or the outside peripheral surface of the shaft portion 26. On this arcuate side 61 of the insert plate 50 are provided a plurality of ribs 63 substantially semicircular in cross section, spaced and angularly arranged so as to coincide with an extend into the helical groove 22 in the nut 21 as shown in Fig. 4. The ribs 63, as shown in Fig. 4, are smaller than the groove into which they extend, thus they do not mechanically connect the nut 21 with shaft portion 26, the mechanically formed connection being provided solely by the antifriction balls 30 substantially filling all single turn, closed circuit channels in which they circulate. It will be seen in Figs. 5, 6 and 7, that each end of a rib 63 on the insert plate is positioned directly over and above an end of two adjacent furrows in said plate. That is, referring to Fig. 2, rib 63a has its one end directly above the one end of furrow 52a and its other end directly above the opposite end of the furrow 52b adjacent to 52a. As has been said, ribs 63 do not mechanically connect nut 21 with shaft portion 26 to cause longitudinal movement of the nut in response to rotation of the shaft, but merely provide means integral with the insert plate forming a filler for a portion of the helical groove in the nut, to deflect the balls 30, prevent them from entering the said helical groove portion and jamming therein and also to guide said balls into the mouth of the tunnel crossover passage clearly illustrated in Fig. 5. Without the ribs 63, the balls 30 would have a tendency to follow the helical groove and not enter the tunnel crossover passage, however, with the ribs filling a portion of the said helical groove in the nut, particularly at the entrance to the tunnel passage, the ball will enter said tunnel passage, pass over the "hypotenuse surface" of strip 57 or 58 to roll through the tunnel to the opposite end of the helical groove portion of the single turn, closed circuit passage or channel.

The insert strip or plate 50 with its plurality of equally spaced, angularly arranged, open sided furrows 52 on one side and its plurality of equally spaced, angularly arranged ribs 63 on its opposite side, together with its screw receiving recesses and holes and chamfered edges may easily and cheaply be made in large quantities, exactly alike by the well known molding or die cast process No exceedingly intricate and expensive machining operation is necessary to form the crossover tunnel in an insertable piece, for the open sided furrows 52 in the easily manufactured insert plate 50, cooperate with the bottom surface 54 of channel 51 in the shaft portion 26 and the strips 57 and 58 therein, to form the respective tunnel crossover passages.

The present invention provides an improved screw and nut device of sturdy and simple structure and design, capable of being produced commercially by simple processes and at a minimum expense.

While the embodiment of the present invention as herein disclosed, constitutes a preferred form, it is to be understood that other forms might be adopted, all coming within the scope of the claims which follow.

What is claimed is as follows:

1. In a device of the character described, the combination with a tubular member, slidably fitting upon a shaft member, the inner peripheral surface of said tubular member and the outer peripheral surface of said shaft having a continuous, multiturn helical groove of similar pitch, coinciding to form a helical channel, one of said members having a longitudinal groove which interrupts the continuity of the helical groove provided thereon; of an insert plate adapted to fit into said longitudinal groove and be rigidly secured to said one member, said insert plate having open furrows in its side fitting upon the shaft, said furrows being of a pitch opposed to the pitch of the helical groove in said one member, each furrow cooperating with the member to form a tunnel connecting oppositely disposed, severed ends of the helical groove in said one member with which it cooperates to form a closed, single turn channel having partly helical and partly diverging portions; ball bearings in each single turn channel, forming the only mechanical connection between the tubular member and shaft; and angular ribs on the side of the insert plate opposite its furrowed side, said ribs coinciding with and extending into the helical groove of the other cooperating member for preventing the ball bearings to follow the normal course of the helical groove in said other member.

2. In a device of the character described, the combination with a tubular member slidably fitting upon a shaft member, the adjacent surfaces of said members each having a continuous, helical groove which cooperate to form a continuous helical channel, of a longitudinal channel in one of said members, said channel being of sufficient depth completely to interrupt the continuity of the helical groove therein; a plate adapted to fit into and be secured in said longitudinal channel, the surface of the plate engaging the bottom surface of the said channel having transverse furrows arranged at an angle opposed to the pitch of the helical groove, said furrows cooperating with the bottom surface of the longitudinal channel to form tunnels, each connecting one end of a groove in said one member with the opposite end of the next adjacent convolution of said helical groove whereby a single turn channel is formed consisting of a helical portion and the connecting tunnel portion; ball bearings in each single turn channel providing the only mechanical connection between said members; and angularly arranged, transverse ribs on the plate, opposite the furrows, said ribs extending into the helical groove of the other member and providing deflectors above each end of a tunnel to prevent the ball bearings from entering the helical groove occupied by said ribs.

3. In a device of the character described, the combination with a tubular member slidably fitting upon a shaft member, the adjacent surfaces of said members each having a continuous, helical groove which cooperate to form a continuous helical channel, of a longitudinal channel in one of said members, said channel being of sufficient depth completely to interrupt the continuity of the helical groove therein; a plate adapted to fit into and be secured in said longitudinal channel, one side of said plate having angularly arranged, transverse furrows, the opposite side of the plate having angularly arranged, transverse ribs, the furrowed side of the plate engaging the said one member and cooperating therewith to form cross tunnels each connecting the opposite ends of adjacent helical grooves in said one member whereby said member has a plurality of single turn grooves, each comprising a helical portion and a diverging, connecting tunnel portion, the transverse ribs on the plate extending into the helical groove of the other member, the one end of each rib terminating at one side of the plate directly above the end of one furrow, the other end of said rib terminating at the opposite side of the plate directly above the end of the next adjacent furrow, the angle of the ribs being opposed to the angle of the furrows; and ball bearings in each single turn groove and tunnel, providing the sole means mechanically connecting the two members.

4. A nut and screw device in which both nut and screw members are provided with a continuous, helical groove respectively which cooperate to form a helical channel, the nut and screw being mechanically connected solely by ball bearings in said channel; a rectangularly shaped, longitudinal slot in one of said members, said slot being deeper than the helical groove therein and thereby interrupting the continuity of said groove; and an insert plate adapted to be secured in said slot, said plate having one arcuated side corresponding to the curvature of the member to which the plate is attached, this side of the plate having deflecting ribs coinciding with and extending into the helical groove of the other, cooperating member, the opposite, flat side of the insert plate having spaced, angular furrows transversely thereof, each end of a furrow aligning and communicating with a severed end of one convolution of the helical groove in said one member, thereby forming a single turn groove consisting of a helical portion and a crossover tunnel portion formed by the furrow in the plate and the bottom surface of the slot in said one member, the longitudinal edges of said plate being chamfered to provide opposite, triangular spaces between the edges of the plate and the slot; and triangular shaped filler strips in said spaces, forming a ramp upon which the ball bearings roll when entering and leaving the tunnel portion of the single turn channel in which they circulate.

5. A nut and screw device in which both nut and screw members have a helical groove in their inner and outer surfaces respectively, the one groove being continuous, the other having each convolution thereof interrupted, said grooves cooperating to form helical channels; a rectangular shaped slot in one of said members, substantially deeper than the helical groove therein whereby the continuity of said other groove is interrupted at each convolution thereof; an insert plate fitting into and secured in said slot, the outer surface of said plate having a plurality of transverse ribs extending into and substantially filling the coinciding portions of the helical groove in the other member, the inner side of the plate having transverse furrows of opposed angular pitch to the ribs, each furrow aligning with and connecting the opposite ends of a severed helical convolution thereby forming a single turn, continuous channel consisting of a helical part and a tunnel portion formed by the furrow and the bottom surface of the slot, the two bottom, longitudinal corners of the insert plate being chamfered to provide a space in the slot; ball bearings in each single turn channel providing the sole mechanical connection between the nut and screw members; and a strip having a triangular cross section in each space along the corners of the slot, providing ramps upon which the ball bearings roll as they enter and leave the tunnel portion of each single turn channel.

6. In a device of the character described, the combination with a tubular member slidably fitting upon a shaft member, the adjacent peripheral surfaces of said members one being provided with a continuous, multiturn helical groove, the other with a helical groove of identical pitch but having each convolution thereof interrupted, the grooves of said members cooperating to form helical channels; of a longitudinal channel in said other member, said channel interrupting the continuity of the helical groove therein; an insert plate adapted to be secured in said channel, said plate having spaced furrows in its one side, angularly arranged so that each furrow communicates with and connects opposite ends of a helical groove in said member severed by the longitudinal channel, each furrow providing the arched wall of the connecting tunnel, the base wall of which is provided by the bottom wall of the longitudinal channel in said member, the furrowed side of the insert plate cooperating with the shaft to form a plurality of single turn channels, each consisting of a helical portion and a connecting crossover tunnel portion; angular ribs on the other side of the insert plate, coinciding with and extending into the helical groove of the other member to provide deflecting elements thereon; and a plurality of ball bearings in each single turn channel, adapted to circulate therein and prevented from diverging therefrom by the deflecting ribs, said ball bearings being the sole means mechanically connecting the tubular and shaft members.

CHARLES H. MORT.
CLYDE W. MAPES.

REFERENCES CITED

The following references are of record in the file of this patent:

UNITED STATES PATENTS

| Number | Name | Date |
|---|---|---|
| 2,227,111 | Sturm | Dec. 31, 1940 |